United States Patent [19]

Becker et al.

[11] Patent Number: 4,958,073

[45] Date of Patent: Sep. 18, 1990

[54] APPARATUS FOR FINE SPATIAL RESOLUTION MEASURMENTS OF EARTH FORMATIONS

[75] Inventors: Arthur J. Becker, Ridgefield, Conn.; Joel L. Groves, Leonia, N.J.; Charles C. Watson, Danbury, Conn.

[73] Assignee: Schlumberger Technology Corporation, New York, N.Y.

[21] Appl. No.: 281,577

[22] Filed: Dec. 8, 1988

[51] Int. Cl.⁵ .......................... G01V 5/04; G01V 5/12
[52] U.S. Cl. ...................................... 250/269; 250/270
[58] Field of Search ............................... 250/269, 270

[56] References Cited

U.S. PATENT DOCUMENTS

| | | | |
|---|---|---|---|
| 2,778,951 | 1/1957 | Tittman | 250/268 |
| 2,934,652 | 4/1960 | Caldwell | 250/267 |
| 2,997,586 | 8/1961 | Scherbatskoy | 378/89 |
| 3,197,638 | 7/1965 | Sinclair | 378/86 |
| 3,202,822 | 8/1965 | Kehler | 250/266 |
| 3,223,968 | 12/1965 | Se Shazo | 340/857 |
| 3,263,082 | 7/1966 | Caldwell | 250/267 |
| 3,321,625 | 5/1967 | Wahl | 250/268 |
| 3,321,627 | 5/1967 | Tittle | 250/267 |
| 3,373,286 | 3/1968 | Han | 250/359.1 |
| 3,407,300 | 10/1968 | Hansen | 378/149 |
| 3,509,341 | 4/1970 | Hindel | 250/363.02 |
| 3,840,746 | 10/1974 | Kehler | 378/89 |
| 3,846,631 | 11/1974 | Kehler | 250/269 |
| 3,864,569 | 2/1975 | Tittman | 250/264 |
| 3,900,731 | 8/1975 | Chevalier | 250/207 |
| 3,900,733 | 8/1975 | Seeman | 250/262 |
| 3,922,541 | 11/1975 | Seeman | 250/256 |
| 4,034,218 | 7/1977 | Turcotte | 250/269 |
| 4,048,495 | 9/1977 | Ellis | 250/264 |
| 4,445,033 | 4/1984 | Preeg et al. | 250/270 X |
| 4,490,609 | 12/1984 | Chevalier | 250/269 |
| 4,661,700 | 4/1987 | Holenka | 250/257 |

OTHER PUBLICATIONS

Schlumberger Log Interpretation Principles/Applications 1987, pp. 41–48.
Tittman, Jay Geophysical Well Logging, Excerpted from Methods in Experimental Physics, vol. 24: Geophysics, pp. 105–123.
J. J. Battista et al., Compton Scatter Imaging of Transverse Sections, Phys. Med. Biol., 1981, vol. 26, No. 1, pp. 81–99.

*Primary Examiner*—Constantine Hannaher
*Assistant Examiner*—Jacob M. Eisenberg
*Attorney, Agent, or Firm*—David P. Gordon; Peter Y. Lee

[57] ABSTRACT

A high resolution gamma-gamma apparatus is provided with a chemical source and a photon detector in such close proximity such that the detector provides a positive response to an increase in formation density. Typically, such a response is obtained when the detector opening is within one source photon mean free path of the source opening. For a Cs 137 source, the furthest spacing would be about two inches, although spacings of less than one inch are preferable. In order to decrease background noise, shielding is placed between the source and detector. A first embodiment of the tool has an uncollimated source, and a substantially uncollimated detector with the source and detector being coaxial and with the detector behind the source and separated by shielding. A second embodiment has a collimated source with an uncollimated detector, while a third embodiment has an uncollimated source with a collimated detector. The provided apparatus are useful for high resolution density and Pe measurements. Additional axially spaced negative response detectors may be included to provided additional information which are useful in correcting for environmental effects. Also, circumferentially spaced detectors along with additional sources are useful in conducting dip analysis.

36 Claims, 10 Drawing Sheets

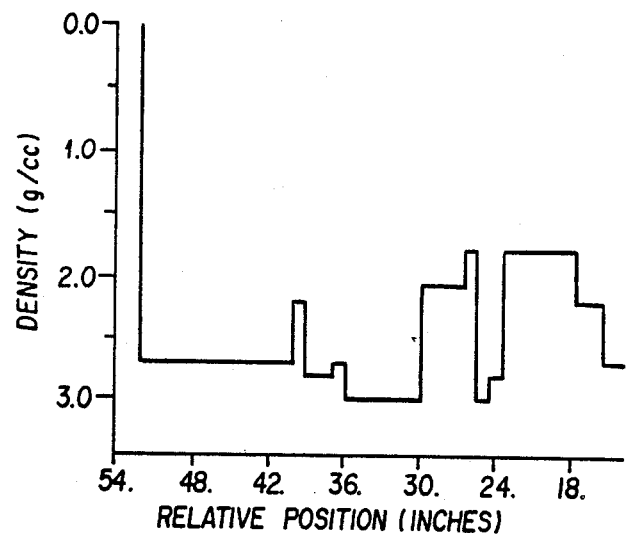
FIG. 2A1
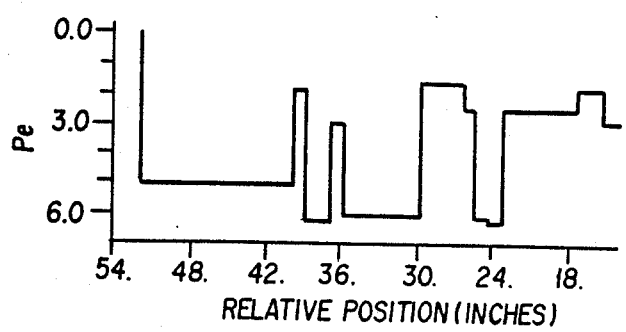
FIG. 2A2

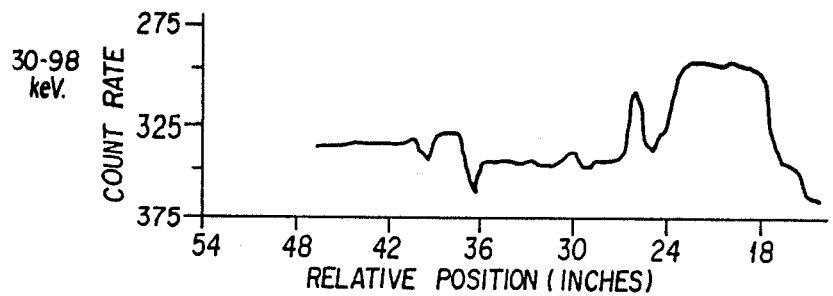
FIG.2B1
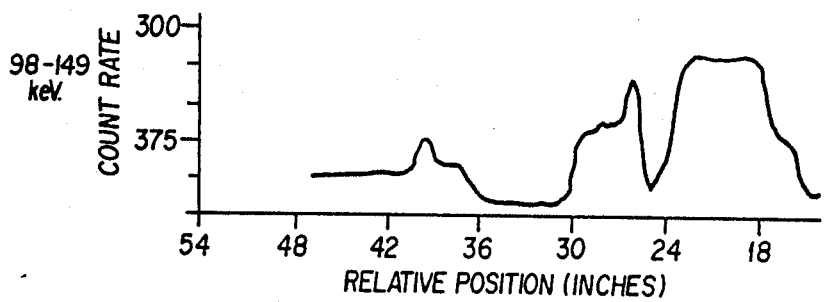
FIG.2B2
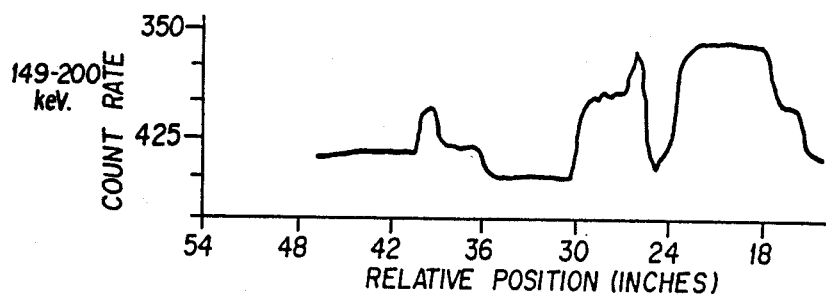
FIG. 2B3
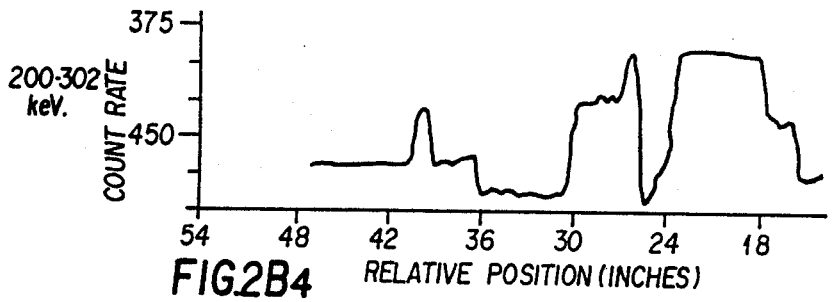
FIG.2B4

APPARATUS FOR FINE SPATIAL RESOLUTION MEASUREMENTS OF EARTH FORMATIONS

BACKGROUND

The present invention relates generally to tools for investigating a borehole traversing an earth formation, and more particularly to fine spatial resolution gamma-gamma type tools which may be useful in determining the density and photoelectric absorption cross section (Pe) of formations.

Gamma-gamma well logging instruments utilizing gamma ray sources and gamma (photon) detectors for obtaining indications of the density and Pe of the formation surrounding a borehole are well known. A typical such device comprises a sonde body containing a gamma ray radioisotopic source, and at least one gamma ray detector, typically a NaI crystal scintillator, separated by depth by about fifteen inches. The metallic body of the sonde provides shielding of the detector from directly penetrating gamma rays. Consequently most of the radiation detected by the detector travels through and interacts with the formation before returning to the sonde. Measurements of the intensity of this returning radiation, typically as a function of energy of the detected photons, provide information regarding physical properties of the formation.

For photons having energies between a few keV and a few MeV, which is the useful and standard range for gamma-gamma devices, there are three significant types of photon/formation interactions: Compton scattering; photoelectric absorption; and pair production. Since pair production cannot occur for photon energies below 1.022 MeV, and since most detected photons have energies less than a few hundred keV, the pair production interaction is significant only for the highest source energies and is therefore ignored for purposes of the discussion herein. The photoelectric absorption and Compton scattering interactions, however, are critical in the understanding of the instant invention.

Photoelectric absorption is an intersection common for photon energies below about 150 keV. In the photoelectric interaction, a photon is absorbed by the electronic system of an atom, leaving the atom in an excited or ionized state. Subsequently, the excited atom may reemit a low energy photon (fluorescence). However, such radiation is usually of too low an energy to make a significant contribution to the formation measurements described herein.

The Compton scattering interaction is important over the entire range of energies considered. It occurs when a photon scatters from an electron, undergoing a change of direction and a corresponding change in energy. The physics of Compton scattering from free electrons, and the relationship between the scattering angle and energy loss is well understood and is expressed according to:

$$E' = E/\{1 + (E/e)(1 - \cos \sigma)\} \quad (1)$$

where E is the initial and E' is the final proton energy, $\sigma$ is the angle between the initial and final directions of the photon, and e=511 keV is the rest energy of the electron. For E=662 keV (the energy of a gamma ray emitted by a Cesium 137 nuclide), the minimum value of E' corresponding to $\sigma$=180 degrees is 184 keV.

The strength of the Compton or photoelectric interaction is characterized by a quantity called the (total) cross section for the interaction. The cross section is defined according to the following. For a beam of photons passing normally through a thin, uniform layer of material having thickness $\Delta t$, and atomic number density $\rho$, the probability that a photon in the beam will have a specified interaction in the target is equal to $\rho \sigma \Delta t$, where $\sigma$ is the atomic cross section for that interaction. The atomic cross section is generally a function of the energy of the photon.

In actuality, the photon interacts with the entire atom, but the interactions are commonly represented in terms of the cross section per electron by normalizing to the atomic number Z and defining an appropriate average over all elements present in the formation. With the Compton cross section per electron denoted as $\sigma_c$, and the photoelectric cross section per electron denoted by $\tau$, $\sigma_c$ depends very weakly on Z and for most measurements this dependence is neglected. On the other hand, $\tau$ depends very strongly on Z according to $Z^n$, where the exponent n is a function of the photon energy. Typically, n is taken to be 3.6, i.e., $\tau \alpha (Z/10)^{3.6} = P_e$. Thus, density measurements made by gamma-gamma devices are most directly measurements of electron density. Techniques for converting the resulting estimates to mass density values are well known to those skilled in the art and will not be discussed herein.

In conducting density and $P_e$ factor determinations, it has been found to be beneficial to utilize various tools having two gamma ray detectors and measurement techniques utilizing results from two detectors as may be seen with reference to U.S. Pat. Nos. 3,321,625 to J. Wahl, 3,864,569 to J. Tittman, 4,034,218 to R. Turcotte, 4,048,495 to D. Ellis, and 4,661,700 to J. Holenka. The detectors are typically denoted as a "near" and "far" detector, and the count rates and energy spectra of the detectors are used for purposes of determining formation density and lithology, preferably free of undesirable "environmental effects". It should be noted at the outset, however, that the location of the "near" detectors of the art relative to the source is typically at a sufficiently great spacing such that the count rate of the received signal is inversely related to the density (by a complex function). This is in contrast to the invention herein, as will be described more particularly hereinafter, where the detector is placed in such close proximity to the gamma ray source that an increase of formation density provides an increased detector count rate.

While the tools of the art have been effective in providing density and Pe information, it will be recognized that the obtained information is information which is essentially averaged over a certain depth of the formation (typically six to twenty-four inches), depending on the spacing of the detectors and the data utilized. Fine spatial resolution (e.g. two inches and less), however has not been obtainable with the existing tools in the industry. In fact, in order to obtain higher resolution, it has been suggested that both the source and detector be tightly collimated (i.e. the area of formation directly illuminated or viewed by the source or detector is limited to an angle on the order of a few degrees). While tight collimation does result in reducing the volume of investigation, it does not significantly reduce the intrinsic vertical spatial resolution of the tool (as will be shown hereinafter), and it has the accompanying drawback of reducing the count rates. Hence, the determinations made from the obtained information in these tightly collimated devices are more susceptible to error due to poor counting statistics, or alternatively, would require the use of a much more intense (and potentially dangerous) radiation source.

In light of the difficulties of the art in obtaining useable fine resolution density and Pe measurements with the existing tools despite the continuing desire and need for such measurements in the industry, an apparatus useful in obtaining such measurements would be greatly advantageous.

SUMMARY OF THE INVENTION

It is therefore an object of the invention to provide a gamma-gamma type logging tool capable of providing highly accurate determinations of earth formation characteristics where the determinations are made with fine spatial resolution.

It is another object of the invention to provide a fine spatial resolution gamma-gamma type tool useful in providing density and/or Pe measurements where the tool makes relatively more efficient use of source photons than those tools known in the art, thereby providing a good count rate and high accuracy with a smaller source.

It is a further object of the invention to provide a fine spatial resolution gamma-gamma type tool useful in determining the density and/or Pe of earth formation, with the tool arranged such that an increase in the formation density in substantially any region of the formation in the vicinity of the tool results in an increase in the total number of photons detected at substantially any energy of interest between 40 and 500 keV.

In order for a density or Pe tool to be commercially acceptable, it should be capable of operating under the rigorous conditions of the borehole environment, and be capable of a precision of about 0.01–0.3 gm/cc in density under typical logging speeds.

In accord with the objects of the invention, an apparatus for obtaining fine spatial resolution indications of characteristics of an earth formation traversed by a borehole is provided and generally comprises a photon source which irradiates the earth formation, and in close proximity thereto, a photon detector which detects photons which have been Compton scattered by the formation. Either the source or the detector or both the source and detector are uncollimated (i.e. open) relative to the formation. The distance between the source and detector openings is chosen such that the response of the tool at energies of interest has non-negative density sensitivity to substantially all regions of the formation. The preferred distance is significantly less than one mean free path of the source photons interacting in formations having typical densities and Pe values, and preferably less than one-half that mean free path. For a typical source such as Cs-137 which emits gamma rays at an energy of 662 keV, the mean free path is about two inches in typical earth formations. With source detector spacings shorter than mean free path, the histories of gamma rays which are emitted into formations having typical density and Pe values are dominated by scattering effects which are incremental to their detection in the presence of small increases in the formation's density, as opposed to scattering and absorption effects which are decremental to their detection. These latter attenuating effects include all of: scattering in the wrong directions; scattering to energies below a detection threshold; and photoelectric absorption of photons. With the incremental scattering effects dominating, the greater the formation density, the greater will be the number of scattered gamma rays detected by the detector (i.e. the detector will have a positive sensitivity relative to density).

A preferred aspect of the apparatus invention is a gamma ray shield located between the source and detector. The shield substantially reduces the number of gamma rays which reach the detector directly from said source and thereby increases the signal/noise ratio. Another aspect of the invention includes the capability of the detector to detect the energies of the scattered gamma rays as well as the number of events recorded. From the energy spectrum, a signal processing means may be used for helping determine the density and/or Pe of thin beds of the formation. Yet another aspect of the invention is the inclusion of two or more detectors either circumferentially or longitudinally spaced. With an extra longitudinally spaced detector, environmental corrections may be enhanced. With extra circumferentially spaced detectors (and, if desired additional sources), fine resolution of the circumferential changes in the formation characteristics may be had. One advantage of such circumferential measurements is the possibility of dip determinations.

The preferred apparatus is useful for obtaining density and/or Pe determinations. In making such determinations, deconvolution of the obtained measurements via data processing can be used to provide even finer resolution. Additional data processing for achieving optimal noise filtering and for providing environmentally corrected determinations can also be utilized.

Additional advantages and objects of the invention will become evident to those skilled in the art upon reference to the detailed description in conjunction with the accompanying drawings.

BRIEF DESCRIPTION OF THE PREFERRED DRAWINGS

FIGS. 1a, 1b, and 1c are side view representations of preferred alternate embodiments of the invention respectively having an uncollimated source and a substantially uncollimated detector, a substantially collimated source and an uncollimated detector, and an uncollimated source and a substantially collimated detector;

FIG. 1d is a front view representation of a segmented, partially collimated detector for use in the FIG. 1a embodiment;

FIGS. 2A1, 2A2 and 2B1–2B4 are a set of six graphs, four of which (FIGS. 2B1–2B4) plot count rate versus position in a formation for four different energy windows for an apparatus as shown in FIG. 1c, and two of which (FIGS. 2A1 and 2A2) show the density and Pe of an artificial formation in which the data were obtained;

FIG. 3 is a cross-sectional schematic representation of a proposed borehole logging apparatus incorporating the apparatus of the invention as shown in FIG. 1a;

FIG. 5b is a representative schematic showing an alternative pad arrangement for the apparatus of FIG. 5a.

DETAILED DESCRIPTION OF THE PREFERRED EMBODIMENT

Before detailing the preferred embodiment of the invention, a discussion of the theoretical underpinnings of the invention is instructive. The stated goal is to obtain a fine spatial resolution formation characteristic indication (preferably density and/or Pe measurement) from a gamma-gamma type tool.

Common gamma-gamma devices work by making energy discriminated measurements of the intensity of gamma radiation which is emitted from a source in the sonde, interacts with the formation, and returns to the tool at the detector. For gamma ray energies in the usual range of 10 keV to 1 MeV, the energy measurements convey information on the macroscopic Compton and photoelectric cross sections of the intervening earth materials. The fundamental length scale governing the transport of this radiation from source to detector is the mean free path ($\lambda(E)$) of the gamma ray against interaction, where $$\lambda(E) = 1/[\rho_e(\sigma_c(E) + \tau(E))] \quad (2)$$

and where $\rho_e$ is the electron density, $\sigma_c$ and $\tau$ are the Compton and photoelectric cross sections per electron, respectively, appropriately averaged over the elements present in the formation, and E is the photon energy. The scale of the gamma-gamma device, on the other hand, is fixed by the distance between the source and detector aperatures, D. It has been determined by the applicants herein that there is a qualitative difference in the nature of the transport physics, and thus in the relation between responses and properties, depending on whether D is greater or less than the mean free path $\lambda(E)$.

Figure 6:
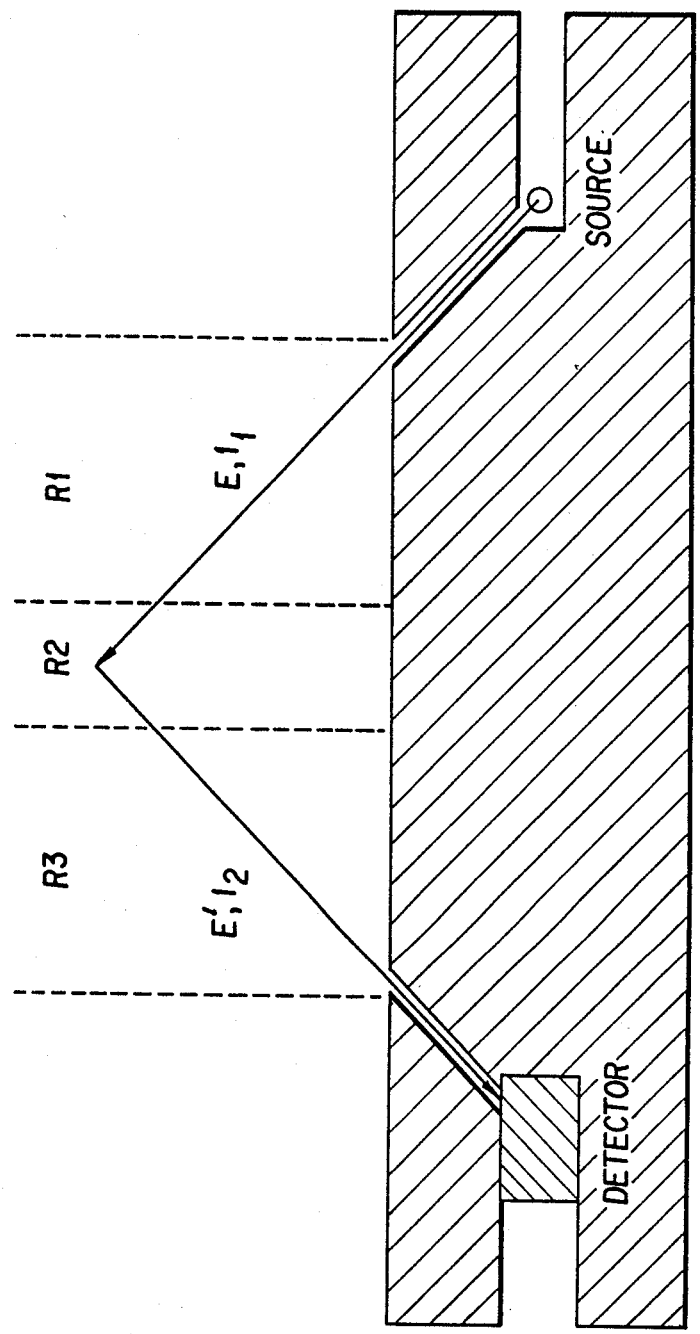
FIG. 6 is a simplified schematic of a highly collimated tool of the prior art.

A simple type of prior art gamma-gamma device is shown illustratively in FIG. 6. Such a configuration is commonly referred to as a "single scatter" geometry due to the constraints on multiple scattering imposed by tight collimation. As indicated in FIG. 6, the formation may be divided into three distinct regions R1, R2, and R3. In region R1, the source photon beam is attenuated by a factor $e^{-\rho_e[\sigma_c(E)+\tau(E)]l_1}$, where E is the source energy and $l_1$ is the path length of the photons through region R1. In region R2, Compton scattering is essential to turn photons toward the detector. The probability of such scattering is proportional to $\rho_e\sigma_c(E)$. In region R3, attenuation contributes a factor similar to that of region R1, except that the cross sections are evaluated at the scattered energy E'. The intensity of radiation detected, I, is thus proportional to $$I \alpha \rho_e \sigma_c(E) e^{-[(l_1/\lambda(E))+(l_2/\lambda(E'))]} \quad (3)$$

In practice, gamma-gamma devices are calibrated by measuring their responses in materials of known density and $P_e$. When a measurement is later made in an unknown formation, the formation density or $P_e$ is determined by relating the deviation of the measured response from the calibrated response to the deviation of the unknown property from the known calibrated value. Using the assumptions of a single-scatter type device, the relative deviation of the detected response for small deviations of the formation's electron density is given by:

$$\delta I/I = [1-(l_1/\lambda(E))-(l_2/\lambda(E'))]\delta\rho_e/\rho_e \quad (4)$$

The factor multiplying the relative density variation is known as the sensitivity of response I to density:

$$S_{I,\rho e} = 1-(l_1/\lambda(E))-(l_2/\lambda(E')) \quad (5)$$

Similarly, the sensitivity of I to $P_e$ is $$S_{I,Pe} = -\rho_e\tau(E)l_1 = \rho_e\tau(E')l_2 \quad (6)$$

Looking at relationship (5), it should be noted that each of the three terms corresponds to one of the three formation regions of FIG. 6. In region R2, increased scattering causes an increased response, and hence a positive term (1) is included. In regions R1 and R3, increased scattering and absorption result only in attenuation of the photons, and hence the negative terms are included. Thus, the density sensitivity depends on whether incremental or decremental interactions dominate. This in turn depends solely on the path length of the photons through the formation measured in units of their (instantaneous) mean free path. If the total path length in units of the mean free path is less than 1, then it can be said that beneficial scattering dominates and $S_{I,\rho e}$ is greater than zero. For longer total path lengths, the attenuation effects of decremental scattering and absorption dominate, and $S_{I,\rho e}$ is less than zero.

It should be appreciated that the path length of a singly scattered photon is determined by the distance between the source and detector apertures and the scattering angle defined by the collimation. For larger scattering angles (and therefore lower detected energy), the path length in the formation is greater than the path length for smaller scattering angles (higher detected energy) given the same source-detector spacing. Since source-detector spacings greater than $\lambda(E)$ necessarily imply that a single scatter gamma-gamma device will have negative density sensitivity, it will be appreciated that a spacing of $\lambda$ serves as an upper bound on source-detector spacing inside of which the incremental scattering dominated regime will obtain. In typical earth formations (e.g. $Z \approx 13$, $\rho \approx 2.7$ g/cc), the mean free path of a photon of energy 662 keV (from a Cesium 137 source) is approximately two inches.

The tightly collimated, single scatter design depicted in FIG. 6 (prior art) successfully restricts the volume of the formation investigated by the detected radiation by constraining the photons to follow a well defined trajectory through the formation. However, this does not have the effect of significantly improving the vertical spatial resolution of such a device. In order to be detected, photons must still travel the entire distance between the source and detector apertures, and thus the device will be sensitive to this entire region of the formation. Further, the existence of the three distinct sensitivity regions for such a device implies fairly complex response behavior in the presence of formation property variations. For example, if such a device were logged past a very thin bed having density somewhat higher than the surrounding formation, the response would first decrease, then increase, then decrease, and then increase to its initial value.

In reality, the interactions in an earth formation are not as simple as set forth in relationship (3), as they usually involve substantial multiple scattering contributions. In particular, with typical source-detector spacings of six to fifteen inches, the gamma rays contributing to responses typically undergo several interactions in the formation. Nevertheless, gamma ray contributions to responses in such devices may be analyzed in terms of spatially distributed sensitivity functions. In particular, small volume regions of the formation in the vicinity of the device may be considered, with a small increase in density either resulting in incremental scattering or incremental attenuation. The domination of one or the other determines the density sensitivity of the response to the region. The total sensitivity response to the formation is then the sum of the contributions from all such regions.

For gamma-gamma devices whose source-detector spacing is several mean free paths, the integral sensitivity of the detector to increases in formation density is invariably negative. This may be understood roughly as a consequence of the fact that relatively few of all the possible scattering events of the photons which could potentially contribute to the response actually serve to increase the probability that they will eventually reach the detector with the requisite energy. This is evident as photons which are scattered in the direction of the detector but are several mean free paths from the detector will most likely undergo additional interactions which are overwhelmingly decremental, at least until the photon reaches the vicinity of the detector.

On the other hand, for devices whose source-detector aperture spacings are sufficiently small, multiply scattered photon histories may contribute positively to the density sensitivity of the responses. The critical factor is the total path length of the photon's trajectory (in terms of the mean free path for its energy during each leg) compared to the number of scattering events it undergoes. As for single-scatter trajectories, each scattering event which increases the photon's probability of reaching the detector will contribute positively to the density sensitivity, while attenuation along each leg of the trajectory will contribute negatively. The balance between these two effects determines the net contribution. For large source-detector spacings, detected photons tend to have traveled further than one mean free path per scattering event, and hence result in a negative sensitivity. When the source-detector spacing of the device is significantly less than approximately one mean free path, however, detected photons tend to have traveled less than one mean free path per scattering event, and hence result in a positive integral density sensitivity.

Furthermore, the closely spaced configuration admits the possibility of having a device whose responses, at nearly all energies of interest, exhibit positive density sensitivity to nearly every region of the formation in its vicinity. An advantage of such a situation lies in the simplicity and robustness of the signal processing required in this case as compared to, e.g., the more complex spatial response of a single scatter type configuration as aforedescribed. The most straightforward means of achieving this situation is to have the region of the formation directly illuminated by the source, and the region of the formation directly viewed by the detector nearly coincide, so that almost any region of the formation can serve as the scattering point for single scattering contributions to the detector. Although, such a geometry is relatively difficult to achieve while still allowing for adequate shielding of the detector from direct radiation, several workable geometries are described hereinbelow. To the extent that some effective collimation is used for shielding purposes, such collimation is preferably designed to provide the minimum possible restriction on the possibly singly and multiply scattered photon paths between the source and detector. Even though certain regions of the formation may be shadowed from making single scattering contributions to the detector, if the path lengths are short enough and if the multiplicity of likely multiply scattered photon paths is high enough, then the multiply scattered photons will contribute a net positive sensitivity from this region. Collimation which restricts photon paths outside of the region between source and detector apertures, on the other hand, is not detrimental to the design.

A further advantageous consequence of enhancing the contribution of multiply scattered photons to the responses of the device of the invention is to increase the integral density sensitivities of these responses beyond what could be obtained from a single scatter type configuration. It will be recalled that according to equation (5), the maximum density sensitivity of a single scatter type measurement is one, with this limit obtained only for an exceedingly small distance between source and detector apertures. In practical devices of the single scatter type, the integral sensitivities will be much less than one. This limit on the maximum sensitivity value, however, does not apply to multiply scattered trajectories. Thus, inclusion of such contributions to the responses can significantly increase the integral density sensitivities of the measurements. Moreover, since singly scattered photons have a relatively high minimum energy (184 keV for a 662 keV source), there is a significant portion of the detected energy spectrum which can be populated only by multiply scattered photons. The information on formation properties, particularly Pe, conveyed by such multiply scattered contributions is quite significant but can be obtained only by a device (such as that of the invention) which accepts a significant proportion of such contributions.

The distinction between the device of the invention and previous suggestions for high resolution gamma-gamma devices is now apparent at a fundamental level. Previously suggested designs attempted to restrict the volume of the formation investigated by restricting the possible paths of the gamma rays through the formation to a particular single scatter trajectory, or a small number of such trajectories. With the device of the instant invention, on the other hand, as many different gamma ray paths as are feasible through the region between the source and detector are allowed, including multiple scattering paths. High resolution is achieved by the close proximity of the source and detector apertures.

The detailed physics showing the density sensitivity of a tool in relation to multiple scattering as well as single scattering events may be seen in Appendix A hereto. In accordance with Appendix A, the sensitivity function can be determined for any given source-detector spacing for a tool, for known parameters.

While the rigorous analysis of Appendix A is useful for setting exact boundaries for positive integral sensitivity in complete complex model (as opposed to the simple single-scattered model), the single scattered model is nevertheless useful for setting and illustrating broad guidelines. Thus, for example, a "critical distance" may be said to exist for the movement of a photon in a formation such that for a given photon energy, and a given formation density and Pe, the photon becomes statistically more likely to be attenuated, (i.e. scattered out of a preferred trajectory, reduced in energy below a detection threshold, or absorbed) than Compton scattered in a desired direction and detected.

The "critical distance", while determinable from the physics of Compton scattering and photoelectric absorption, has been found empirically to be approximately the mean free path of the photons emitted from the source (in accord with the simple model). In formations having densities of approximately 2.7 g/cc and Pe's of approximately 2.6, it can be determined that the "critical distance" between the Cesium source and detector apertures is approximately two inches. However, if the source-detector spacing was chosen to be at the full "critical distance", the integral density sensitivities of the device's responses would be approximately zero. This would not necessarily dictate that a density measurement could not be made with such a device, since the spatially distributed sensitivity function would not necessarily be zero everywhere. However, it would indicate that such a device would make a very poor measurement of the formation density since it would be very insensitive to formation density variations of low spatial frequency; the same being the dominant condition in most earth formations of interest. Therefore, in order to obtain adequate integral density sensitivity, as well as to improve the intrinsic spatial resolution of the device and to increase the efficiency of the source utilization, it is preferable to locate the detector aperture at a spacing from the source which is significantly less than the "critical distance" of a mean free path.

From the provided physical discussion, it can be seen that to obtain the highest positive density sensitivity, theoretically the applicants have found that it would be desirable to locate the detector at the same location as the gamma ray source. Such a location, however, has an important drawback; where the source and detector are located closely together, the detector will detect many gamma rays which never reach the formation. In fact, so many non-scattered gamma rays would reach the detector that the detector circuitry would likely be saturated such that a good percentage of gamma rays scattered by the formation would not be properly counted. It is seen, therefore, that by locating the source and detector together, a large source of background noise is introduced. Thus, the decision of where to place the detector relative to the source and shielding must trade off the background noise factor against the fact that the highest count rate for backscattered events, the highest density sensitivity and finest intrinsic resolution all occur at a source-detector spacing of zero.

Figure 1A:
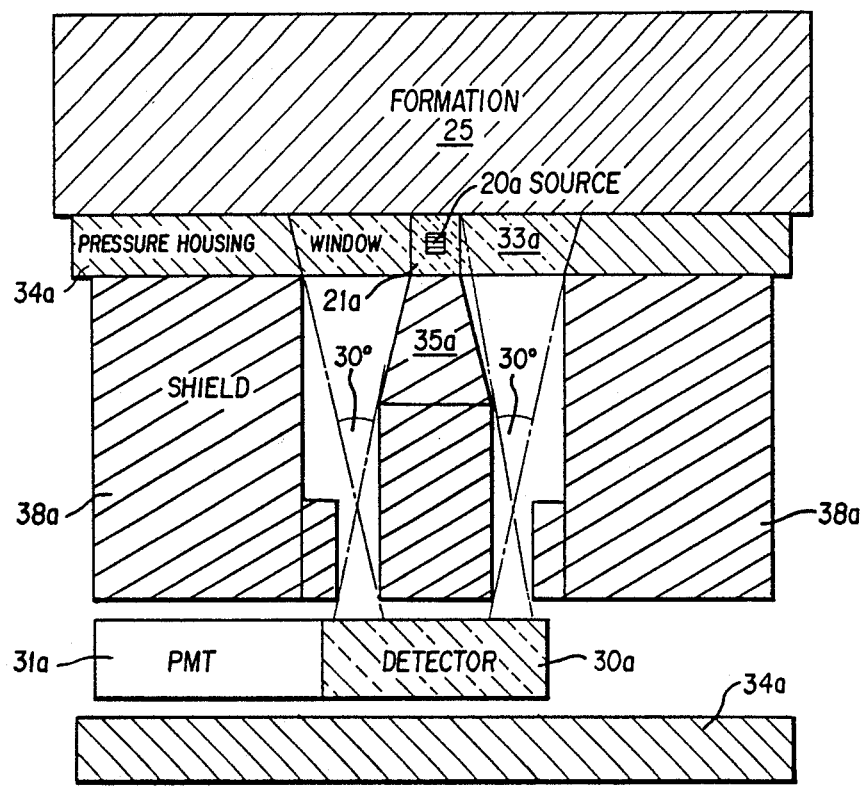

Turning to scaled FIG. 1a, a top view representation of a preferred first embodiment of the invention is seen. In FIG. 1a, a source 20a, such as a Cs-137 or Co-60 source is distanced from a formation 25 by a distance of approximately one-quarter inch and is preferably located in its own pressure vessel 21a. Coaxial with, and approximately two and one-half inches directly behind the source 20a is a NaI or GSO (gadolinium orthosilicate) detector 30a and an associated photomultiplier tube 31a. A practical detector shape for effective light collection in this arrangement is a rectangular solid. Pressure housing 34a protects the detector 30a and photomultiplier 31a while the pressure window 33a in the pressure housing 34a permits photons to enter the tool and be detected. If desired, a calibration source (not shown) may also be provided adjacent detector 30a. With the provided source-detector arrangement of FIG. 1a, a longitudinal spacing of approximately zero is accomplished, as the axis of the center of the detector 30a extends through the source 20a. Generally cylindrical shielding 35a is provided between the source and detector to absorb gamma rays emitted from the source towards the detector. To prevent emitted gamma rays which are neither directed towards the detector 30a nor towards the formation 25 from finding their way to the detector 30a, additional shielding 38a is provided on the sides. Thus, while some collimation results from the side shielding, it will be appreciated that the detector 30a is substantially uncollimated as the possible angles of photons being detected subscribes at least approximately thirty degrees (and in fact, approximately fifty-six degrees with the full detector 30a taken into account) as opposed to the more restrictive collimation found in much of the art as seen, e.g. in U.S. Pat. Nos. 2,934,652 and 3,263,082 to Calwell, 3,202,822, 3,840,746, and 3,846,631 to Kehler, and 4,034,218 to Turcotte. Likewise, it will be appreciated that the source 20a is in essence totally uncollimated.

The arrangement of FIG. 1a has several advantages and several disadvantages as compared to the embodiments shown in FIGS. 1b and 1c, to be discussed hereinafter. The advantages include the ability to reduce the source strength to a relatively low 20–200 mCi, as well as the geometry providing an excellent signal/noise ratio, both of which are due to the source 20a being totally uncollimated relative to the formation 25. A further possible advantage concerns the compactness of the coaxial geometry which would be even a greater advantage with the use of a solid-state detector instead of NaI detector 30a or an ultra-compact photmultiplier instead of photomultiplier tube 31a. The disadvantages include the slightly poorer vertical resolution relative to the other provided geometries (although the two inch resolution obtained is significantly better than that obtainable by the prior art), and the background contributed by the pressure-housing window 33a. It has been found, further, that increased vertical resolution may be obtained by segmenting detector 30a into at least two segments (such as segments 30a-1 and 30a-2 seen in FIG. 1d) and by partially collimating each segment (with collimation 35a-1 and 35a-2) as seen in FIG. 1d. Of course, the trade-off for the increased vertical resolution is the requirement of a higher source strength.

With the provided uncollimated source a substantially uncollimated detector geometry of FIG. 1a, a sizable fraction of the gamma-rays scattered in the region of interest directly in front of the apparatus will be detected. Thus, the source strength necessary for high count rates is significantly lower than the configurations of the art having tight collimation, and the desired source strength is chosen accordingly preferably between 20 and 200 mCi, although stronger sources could be utilized in certain circumstances such as where high count rate detectors are employed. The source energy is also a matter of choice and depends mainly in the desired energy of the backscattered radiation as well as the ability to shield the detector from direct radiation. As the source energy increases, the effect of photoelectric absorption by high-Z elements in the formation or in a mudcake (such as barite) decreases. However, the high density and high-Z shield between the source and the detector likewise becomes less effective in shielding the detector. As a compromise between the conflicting desires of direct shielding and barite penetration, a high energy source such as Cs-137 is used in the preferred embodiment. If desired, higher energy sources such as Co-60 or lower energy sources as Ba-133 may be used.

It will also be appreciated that with the geometry of FIG. 1a, the effective source-detector spacing is much less than the critical two inches, and in fact, close to zero. Thus, the measured signal is strongly scattering dominated as opposed to attenuation effect dominated, and a formation of increased density provides a higher count rate signal. Because the shielding between the sources and detectors is relatively thin, it is desirable to tailor the detector response so that it becomes somewhat transparent to the high-energy gammas of the source, while being much more opaque (i.e. registering a count or event) for the lower energy backscattered radiation. Thus, preferably, a relatively thin detector is used.

Figure 1B:
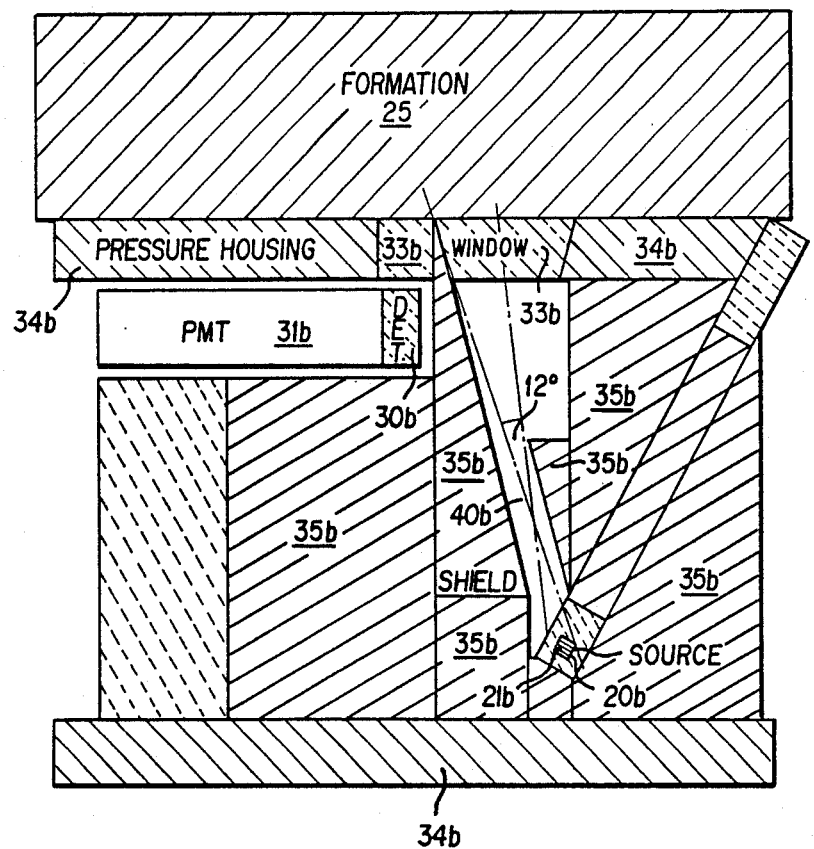

Turning to FIG. 1b, a second embodiment (substantially collimated source 2 uncollimated detector) of the invention is seen. A source 20b is set back about three inches from the formation 25, while the detector 30b and its associated photomultiplier tube 31b are located directly behind pressure window 33b and pressure housing 34b, nearly adjacent the formation. The source 20b is substantially surrounded by shielding 35b to prevent gamma rays from source 20b from directly reaching detector 30b without entering formation 25. However, a path 40b is provided in shielding 35b to permit gamma rays to enter the formation. As indicated in FIG. 1b, the path 40b is substantially collimated by shielding 35b which severely limits the angle opening from the source 20b to the formation 25 to about twelve degrees. If desired, shielding 35b may be non-cylindrical (e.g. elliptical in cross-section) to provide a wider angle opening in a plane going into and out of the paper of FIG. 1b.

The backscatter detector 30b of FIG. 1b is separated from the formation only by a thin pressure housing window 33b, and is located within about one half an inch from the location of the furthest direct gamma ray path entering the formation which originates at the source. Associated photomultiplier 31a is shielded from the formation by pressure housing 34b which also slightly collimates the detector. In essence, however, detector 30b is uncollimated relative to the formation, as window 33b provides an approximately ninety-degree opening. Moreover, because shielding 35b is very narrow adjacent the detector 30b, gamma rays exiting the formation at correct angles within an inch to the right of the detector 30b (in the orientation of FIG. 1b) might reach the detector unaffected.

As with the embodiment of FIG. 1a, the FIG. 1b embodiment has its advantages and disadvantages relative to the other preferred embodiments. In particular, the spatial resolution of the FIG. 1b device can be as small as one-half inch, which is substantially better than what is provided by the other two geometries, and the depth of investigation into the formation is somewhat deeper, particularly for low energy backscattered photons. In addition, the geometry of FIG. 1b provides an excellent signal/background ratio as well as an excellent density sensitivity. On the other hand, the source intensity required for the FIG. 1b geometry is somewhat larger (at least 1.0 Ci.) than that required by the others, and the shielding of the detector between the detector and source requires more exacting geometries than that required by the others to prevent background noise as well as over- or under-shooting of results where density boundaries are traversed.

Figure 1C:
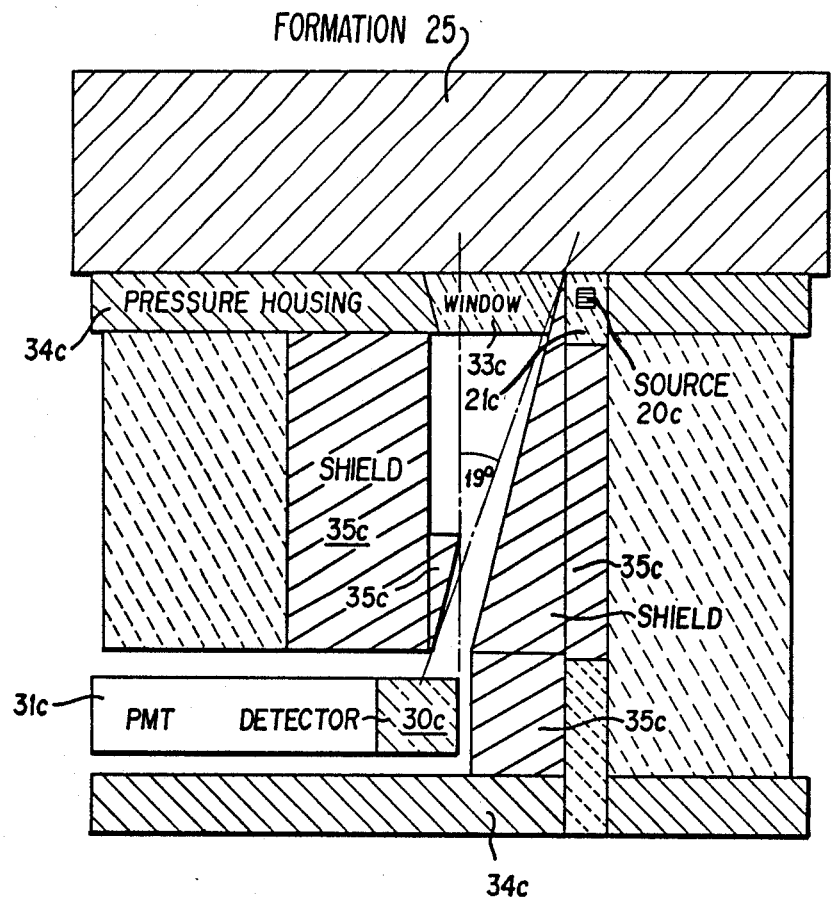
Figure 1D:
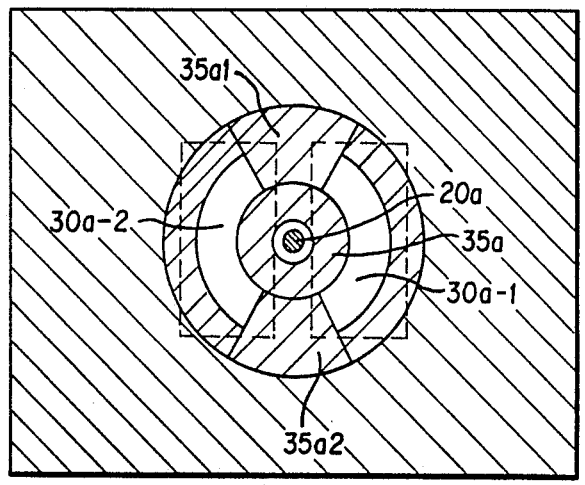

The embodiment of FIG. 1c is in a sense the converse of the embodiment of FIG. 1b, as the source 20c is now open (uncollimated) to the formation 25 and the detector 30c is now substantially collimated. As with the other geometries, shielding 35c is used to reduce background from gamma rays emitted directly towards detector 30c from source 20c, and a pressure housing 34c with pressure window 33c therein is used to separate the detector 30c and its associated photomultiplier 31c from the formation 25 while permitting photons to enter the tool and be detected. In addition, shielding 35c is seen to be arranged so as to provide collimation which restricts the solid angle viewed by the detector 30a to approximately nineteen degrees. Again, if desired, non-cylindrical shielding could be provided.

With the uncollimated source and substantially collimated detector arrangement, the distance between the source and the location of the furthest direct gamma ray path exiting the formation which terminates at the detector is slightly greater than one half an inch. Hence, positive sensitivity of the tool to increases in formation density is guaranteed.

The arrangement of FIG. 1c provides a mid-point in the relative advantages and disadvantages of the geometries of FIGS. 1a and 1b. In particular, the source strength need not be as great as the source strength of FIG. 1b, as the source of FIG. 1c is open (uncollimated) to the formation. On the other hand, the source strength of source 20c must be greater than that of source 20a as detector 30c is substantially collimated while detector 30a is substantially uncollimated; and thus, a larger source is required in order to obtain the necessary count rate to permit a good statistical analysis. In a similar fashion, the vertical resolution of the FIG. 1c arrangement is between the resolutions of the other preferred embodiments.

Using a test apparatus similar to that shown in FIG. 1c, a set of measurements was obtained (see FIGS. 2B1–2B4) by moving the apparatus having a NaI crystal detector and a Cs137 662 keV source through an artificial formation. The artificial formation was comprised of diabase, 7075 aluminum, 6061 Aluminum, fused quartz, marble, magnesium alloy, graphite 2204, and epoxy gravel, having bulk densities ranging from 1.77 g/cc to 3.00 g/cc, and Pe values ranging from 0.2 Pe units to 6.2 Pe units, where a Pe unit is defined by the equation $Pe = (Z/10)^{3.6}$, averaged over the atomic numbers Z of the formation's elemental constituents weighted by their electron densities. The relative position of the changing formation elements is set forth in FIGS. 2A1 and 2A2, with the real densities and Pe being plotted over the length of the artificial formation as indicated. As may be seen, several of the formation layers are only one inch thick.

Figure 4:
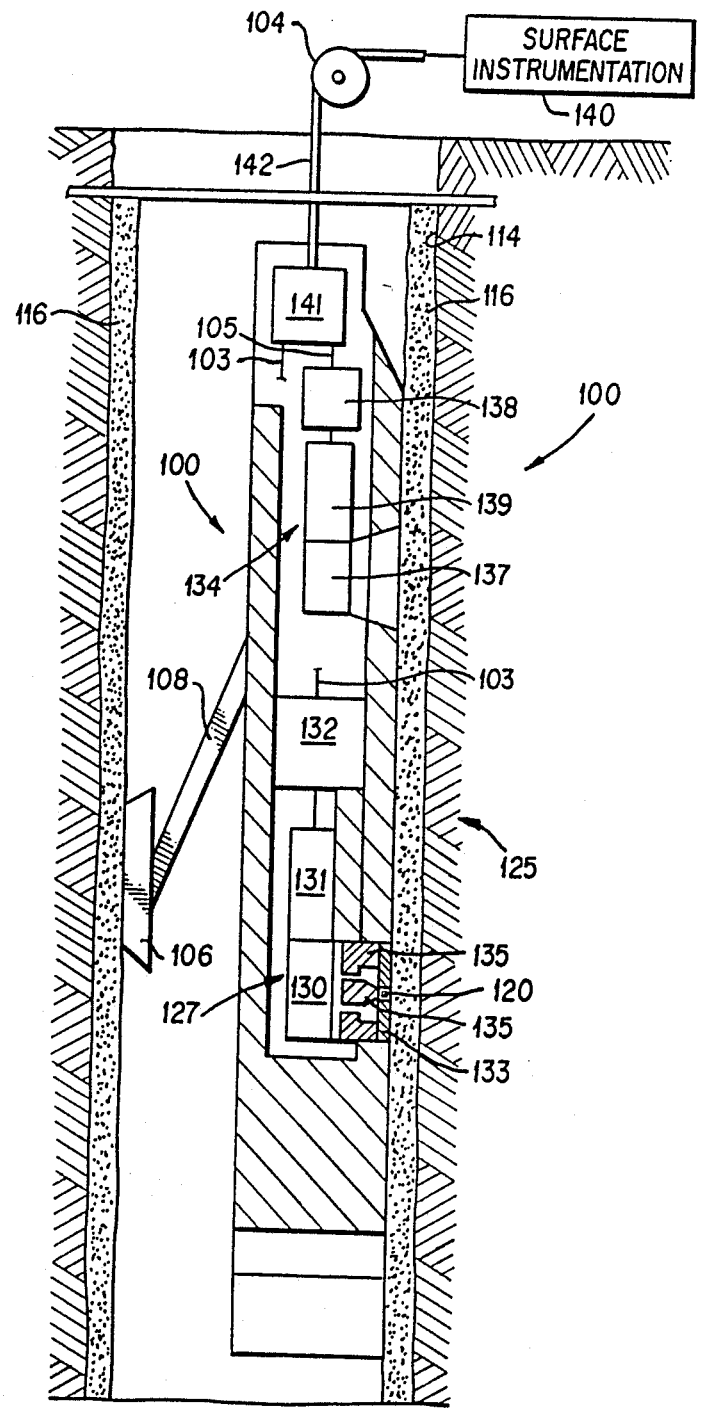
FIG. 4 is a cross-sectional schematic representation of the proposed borehole logging apparatus of FIG. 3, further including a far-spaced detector.

With the provided apparatus and formation, the detected scattered gamma rays were divided into four energy windows, as indicated in four logs of FIGS. 2B1 through 2B4. The response at different energy levels, without signal processing or deconvolution, shows that the vertical resolution for a change in density is very good. Indeed, the highest-energy window which corresponds to scattering in the small region just in front of the path for the collimated detector has an extremely sharp density response. Moreover, the count rates for all but the lowest energy window are substantially linearly related to the formation density. Thus, for small radial depths, the provided apparatus can provide extremely accurate indication of formation density with excellent resolution. By providing energy discrimination, the excellent resolution of density measurements may still be had for larger radial formation distances.

Figure 3:
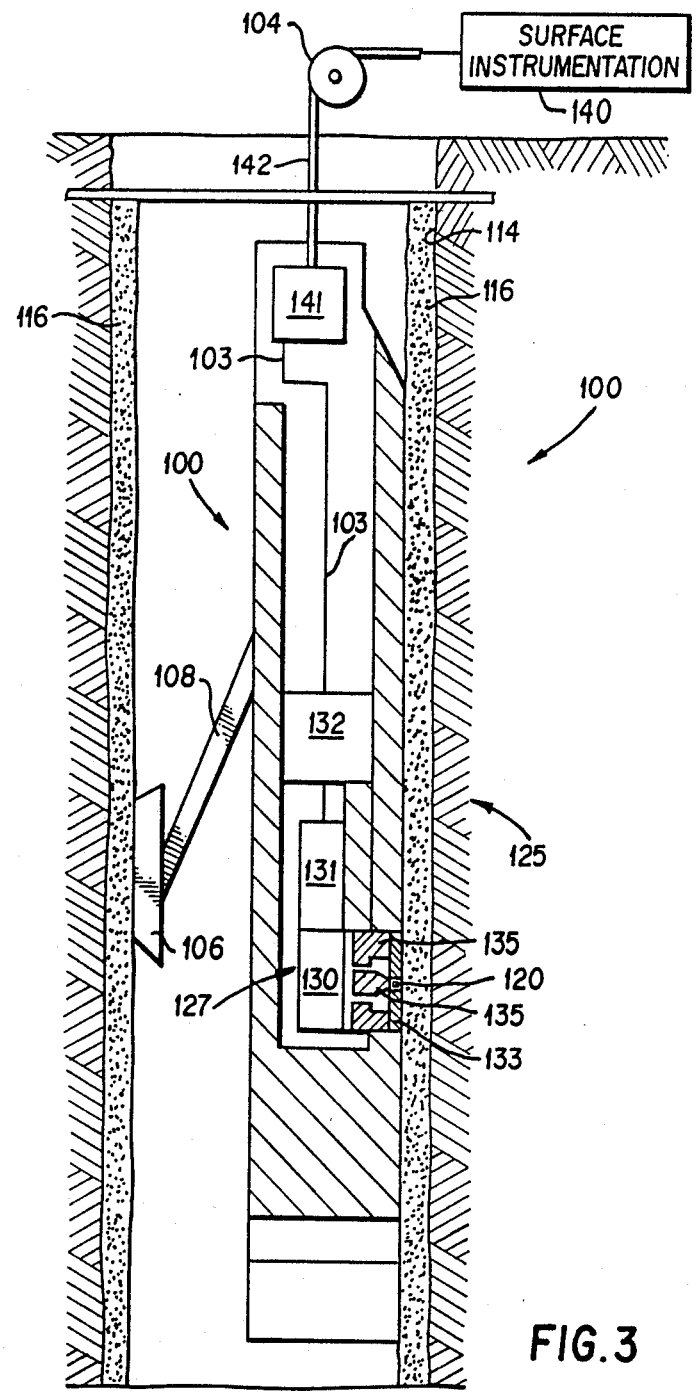

Turning to FIG. 3, a proposed borehole logging apparatus 100 incorporating the apparatus of the invention as seen in FIG. 1a is seen in rough form. The apparatus 100 is shown in a borehole 114 which traverses formation 125. A mudcake 116 is shown on the interior wall of the borehole. The logging apparatus or sonde 100 is suspended in the borehole through the use of winch 104 and cable 142, and is urged against the borehole (mudcake) wall by means of a linkage (arm) 108 and eccentering skid 106 so that the gamma ray source 120 can be urged up close to the formation 125. The gamma ray source is preferably a pellet of Cs137 emitting gamma rays of an energy of 662 keV into the formation. Directly behind the gamma ray source 120 is shielding 135 in accord with the details of FIG. 1a. Behind shielding 135 is a thin NaI gamma ray detector 127 which is comprised of crystal 130 and photomultiplier tube 131. Connected to the gamma ray detector 127 are detector electronics 132 which may be used to discriminate the pulses associated with the detector 127 into various energy windows. The processed information may then be sent via lead 103 to sonde transmission electronics 141 which may further process the information and send it uphole to surface instrumentation 140 via cable 142.

If desired, and as shown in FIG. 4, sonde 100 may include a second NaI detector 134 which may be substantially open or collimated as desired. The second detector 134 is spaced at a long spacing (preferably at least four to six inches) from the source. Detector 134 is comprised of a crystal 137 and a photomultiplier tube 139 which is responsive to the flashes of the crystal 135. In turn, the photomultiplier tube 139 is connected to detector electronics 138 which can discriminate the pulses associated with the detected gamma rays into various energy windows. Detector electronics 138 is connected to sonde transmission electronics 141 via lead 105, and hence the information from the second detector 134 may be transmitted to the surface instrumentation 140.

In operation, the sonde 100 is placed downhole, lowered to a desired longitudinal depth, and forced against the borehole wall by the opening of arm 108. At a desired time, the electronics are activated such that a count is made of the number of gamma rays detected in each of a plurality of predetermined energy windows. As the tool is dragged up the borehole, information is gathered for a preferably predetermined amount of time and the accumulated counts for the time interval are transmitted uphole. Then, using the count rate of preferably all of the windows, but at least one window, density determinations may be made by equating density to a function of the count rates of the various windows. Also, by using the relative count rates of at least two of the windows, the Pe of the formation may be determined. After a sequence of measurements over time corresponding to different borehole depths are obtained, an even more refined density and Pe measurement may be obtained by deconvolving the obtained information. Thus, the density for a particular location is determined as a function of the count rates in at least one of the energy windows at that location, and preferably at both previous and future locations. As a result of deconvolution, even if the the intrinsic vertical resolution of the tool is approximately two inches, if information (a data set) is obtained at smaller intervals, finer resolution may be obtained.

Additional processing to correct for environmental effects may occur concurrent with the determination of density and Pe. For example, the effect of mudcake may be substantially eliminated by particularly processing information from the energy windows. Also, the background (noise) due to detected gamma rays which were affected by an interaction with the shielding as well as those gamma rays which reach the detector directly from the source without having been scattered by the formation may be eliminated by obtaining background spectra out of the borehole (in air). Alternatively, background noise due just to non-scattered detected photons may be avoided by choosing energy windows carefully and thereby effectively filtering out the particular energy of such photons.

It will be recognized that environmental corrections may also be accomplished according to techniques known in the art modified for the particular tool geometry of FIG. 4 if information from two detectors (a "near" and "far") is utilized.

Figure 5A:
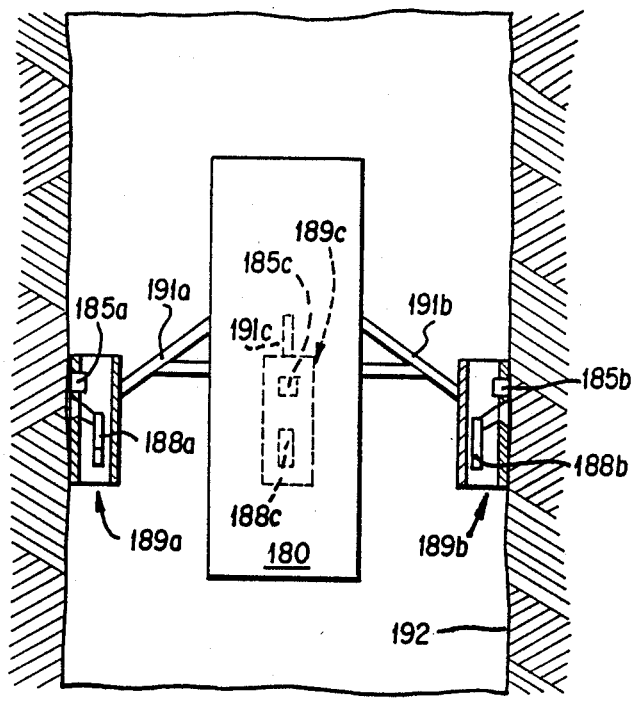
FIG. 5a is a representative schematic showing a plurality of sources and detectors circumferentially spaced as pad devices arranged as the apparatus of FIG. 1c.

Turning to FIG. 5a, an apparatus 180 having a plurality of sources 185a, 185b, 185c and detectors 188a, 188b, 188c radially spaced as pad devices 189a, 189b, and 189c and each arranged as the apparatus of FIG. 1c is seen. As indicated, apparatus 180 would extend arms 191a, 191b, 191c having their respective pad devices 189 such that the source 185 would be in close contact with the borehole 192. By dragging the apparatus 180 along the borehole and continually obtaining measurements, indications of formation characteristics at different circumferential locations around the borehole may be had. Then, by comparing results, the dip of the formation can be measured according to other techniques known in the art.

Figure 5B:
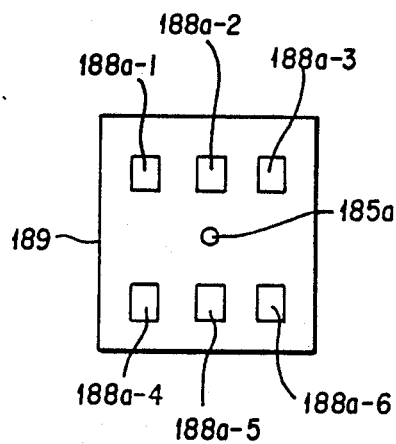

If desired, each pad device 189 of FIG. 5a could assume an arrangement as seen in FIG. 5b, where a single uncollimated source 185a could be utilized along with an array of detectors such as detectors 189a-1, 189a-2 . . . , 189a-6.

There has been described and illustrated herein apparatus using gamma ray sources and detectors for obtaining fine spatial resolution indications of earth formation characteristics. While particular embodiments of the invention have been described and illustrated, it is not intended that the invention be limited thereby, as it is intended that the invention be broad in scope and that the specifications be read likewise. Thus, while a spacing of two inches was described as the "critical distance" at which the detector opening had to be placed relative to the source opening such that a gamma ray would not have to travel more than two inches in the formation, those skilled in the art will recognize that the exact "critical distance" is a function of, among other things, the formation, and the gamma ray energy. Thus, for particular situations, two inches might be too great a spacing, while for other situations, a spacing of slightly greater than two inches might be satisfactory. Further, it should be appreciated that the "critical distance" spacing (dictated by the mean free path) is really a rough limit on the source and detector locations. A more exact distance limit for a particular tool geometry, particular formation composition, particular energy source, et. is set by requiring that the tool show a nonnegative response to an increase in density in the formation. Of course, additional limitations such as requiring that all energy windows of the detector show a nonnegative response to an increase in density anywhere in the formation, or that all energy windows of the detector show a positive response to an increase in density in the vicinity of the source and detector might also be utilized to define the outer scope of the invention.

It should also be recognized that while various preferred geometries of the apparatus have been provided, a plethora of other geometries will suggest themselves to those skilled in the art. What is particularly important is that a high enough count rate be provided with low noise and with good vertical resolution. Thus, while the invention was described as having shielding between the gamma source and detector to prevent the detector from becoming saturated with gamma rays which yield no information regarding the formation, those skilled in the art will recognize that if a detector which could handle a tremendous count rate were provided, shielding might not be required. Moreover, with regard to the detectors, it will be appreciated that additional detectors may be located both circumferentially and longitudinally with respect to the detector which is in close proximity to the source. While one embodiment showed three circumferentially spaced detectors, it will be appreciated that four, five or more detectors could be used. Indeed, each detector need not have its own related source. Likewise, while another embodiment showed two longitudinally spaced detectors, it will be appreciated that three or more detectors could be used. In fact, longitudinally and circumferentially spaced detectors could be used together. Further, while the sources described were monoenergetic sources, those skilled in the art will appreciate that other sources such as a bremsstralhlung source could be utilized effectively within the scope of the invention, provided of course, that the source and detector were situated such that an increase in density of the formation would produce a non-negative integral source response. Therefore, it will be apparent to those skilled in the art that other changes and modifications may be made to the invention as described in the specification without departing from the spirit and scope of the invention as so claimed.

APPENDIX A

The inhomogeneous, linear, time independent gamma ray transport equation is:

$$\vec{\Omega} \cdot \vec{\nabla}\phi + (\Sigma_c + \Sigma_T)\phi - \int dE' \int d\vec{\Omega}' \frac{d\Sigma_c(\vec{r}, E', \vec{\Omega}' \to E, \vec{\Omega})}{dEd\vec{\Omega}} \phi(\vec{r}, E', \vec{\Omega}') = S.$$

where:
$\Sigma_c = \Sigma_c(\vec{r}, E)$ is the macroscopic Compton cross-section;
$\Sigma_T = \Sigma_T(\vec{r}, E)$ is the macroscopic photoelectric cross-section;
$\phi = \phi(\vec{r}, E, \vec{\Omega})$ is the photon (angular) flux, which is equal to the speed of light times the photon density;

$$\vec{\Omega} = \frac{\vec{v}}{|\vec{v}|}$$

where
$\vec{v}$ is the photon velocity;
$\vec{r} = (x, y, z)$ is the spatial position;
E is the photon energy;

$$\frac{d\Sigma_c}{dEd\vec{\Omega}}$$

is the differential Compton cross-section for scattering from $(E', \vec{\Omega}')$ to $(E, \vec{\Omega})$; and,
$S(\vec{r}, E, \vec{\Omega})$ is the source distribution.

The analytical design criteria for designing a backscatter geometry are specified by defining the source function, S, and the material functions, $\Sigma_c$ and $\Sigma_T$ (plus some boundary conditions). The above equation can then, in principle, be solved (numerically) for $\phi$. But an explicit solution for $\phi$ everywhere is not necessary to determine the sensitivity.

The tool response of interest is specified by the equation $$R_i = \int dE \int d\vec{r} \int d\vec{\Omega} S_i^\dagger(\vec{r}, E, \vec{\Omega}) \phi(\vec{r}, E, \vec{\Omega}),$$

where $S_i^\dagger$ is an appropriate response function (e.g., the NaI photoelectric cross-section in the detector crystal).

The corresponding adjoint transport equation is:

$$-\vec{\Omega} \cdot \vec{\nabla}\phi_i^\dagger + (\Sigma_c + \Sigma_T)\phi_i^\dagger - \int dE' \int d\vec{\Omega}' \frac{d\Sigma_c(\vec{r}, E, \vec{\Omega} \to E', \vec{\Omega}')}{dE'd\vec{\Omega}'} \phi_i^\dagger(\vec{r}, E', \vec{\Omega}') = S_i^\dagger.$$

where:
$\phi_i^\dagger(\vec{r}, E, \vec{\Omega})$ is the adjoint flux corresponding to response $R_i$. $\phi_i^\dagger(\vec{r}, E, \vec{\Omega})$ is related to the probability that a photon at $\vec{r}, E, \vec{\Omega}$ will eventually contribute to $R_i$.

The sensitivity density is then given by $$S_{ij}(\vec{r}) = \int dE \int d\vec{\Omega} \frac{\phi(\vec{r}, E, \vec{\Omega})}{R_i} \left[ \int dE' \int d\vec{\Omega}' \frac{d\Sigma_j(\vec{r}, E, \vec{\Omega} \to E', \vec{\Omega}')}{dE'd\vec{\Omega}'} \phi_i^\dagger(\vec{r}, E', \vec{\Omega}') - \Sigma_j(\vec{r}, E)\phi_i^\dagger(\vec{r}, E, \vec{\Omega}) \right]$$

where j refers to either Compton or photoelectric interactions. The electron density sensitivity is the sum of the Compton and photoelectric sensitivities:

$$S_{ipe}(\vec{r}) = S_{ic}(\vec{r}) + S_{iT}(\vec{r})$$

The integral sensitivity of response $R_i$ to variations in the formation's electron density is $$S_{ipe} = \int_{formation} S_{ipe}(\vec{r}) d\vec{r}$$

$S_{ipe}$ is therefore completely determined from a specification of:

| | |
|---|---|
| $S(\vec{r}, E, \vec{\Omega})$, | the source function, |
| $S_i(\vec{r}, E, \vec{\Omega})$, | the response function, |
| $\dfrac{d\Sigma_c(\vec{r}, E, \vec{\Omega} \to E', \vec{\Omega}')}{dE'd\vec{\Omega}'}$, | the differential Compton cross-section function which determines the integral cross-section), and |
| $\Sigma_T(\vec{r}, E)$, | the total photoelectric cross section function. |

The source-detector spacing is fixed by the specification of S and $S_i^\dagger$.

The attached paper entitled "Monte Carlo Computation of Differential Sensitivity Functions" describes an efficient numerical technique for computing $S_{ij}(\bar{r})$.

We claim:

1. An apparatus for obtaining indications of at least one characteristic of an earth formation traversed by a borehole, comprising:
   (a) a source means for irradiating said formation with photons capable of Compton scattering in said formation; and
   (b) a detector means for detecting photons Compton scattered by said formation,
   said source means positioned at a first location on said apparatus and arranged such that photons from said source means enter said formation, and said detector means positioned at a second location on said apparatus and arranged such that photons having Compton scattered enter said apparatus for detection by said detector means, wherein said first and second locations are in such close proximity and said source and detector means are so arranged such that said detector provides a non-negative response to an increase of density in said earth formation for densities and Pe factors typical of earth formations.

2. An apparatus according to claim 1, wherein:
   at least one of said source and detector means is uncollimated relative to said formation so as to permit a substantial number of multiply scattered photons to be detected by said detector means.

3. An apparatus according to claim 2, wherein:
   said detector means includes discrimination means for sensing energies of said detected Compton scattered photons and dividing said sensed detected Compton scattered photons into a plurality of energy windows, and
   said first and second locations are located in such close proximity such that said detector provides a positive response to an increase in density in all said energy windows in response to an increase in density of said formation in a vicinity of said source and said detector.

4. An apparatus according to claim 2, wherein:
   said first and second locations are located within a distance equal to the mean free path in said formation of a mean energy of said photons radiated from said source means.

5. An apparatus according to claim 2, further comprising:
   (c) shielding means disposed between said source and detector means for substantially reducing amounts of photons reaching said detector means directly from said source means without Compton scattering in said formation.

6. An apparatus according to claim 5, wherein:
   said detector means is substantially coaxial with said source means relative to a perpendicular to a long axis of a wall of said borehole, with said source means located relatively close to said borehole, said shielding means located behind said source means, and said detector means located behind said shielding means, wherein said detector means is substantially shielded from photons emanating from said source means directly towards said detector means, but said detector means is substantially uncollimated relative to a volume of said formation in a vicinity of said source means.

7. An apparatus according to claim 5, wherein:
   said shielding means substantially collimates said detector relative to said formation, wherein said source means is uncollimated relative to said formation.

8. An apparatus according to claim 7, wherein:
   said source and detector means are relatively displaced along a long axis of said borehole, and said source means is in relative close proximity to a wall of said borehole and said detector means is relatively distant from said borehole wall.

9. An apparatus according to claim 8, wherein:
   said first and second locations are located within a distance equal to the mean free path in said formation of a mean energy of said photons radiated from said source means, and
   said first and second locations are further located in such close proximity such that said detector provides a positive response to an increase in density in response to an increase in density of said formation in a vicinity of said source and said detector.

10. An apparatus according to claim 9, wherein:
    said source is a Cesium 137 source positioned at said first location, and said first location and a location of an opening in said shielding means which substantially collimates said detector are located within one inch of each other.

11. An apparatus according to claim 5, wherein:
    said shielding means substantially collimates said source relative to said formation, wherein said detector means is uncollimated relative to said formation.

12. An apparatus according to claim 11, wherein:
    said source and detector means are relatively displaced along a long axis of said borehole, and said detector means is in relative close proximity to a wall of said borehole and said source means is relatively distant from said borehole wall.

13. An apparatus according to claim 12, wherein:
    said first and second locations are located within a distance equal to the mean free path in said formation of a mean energy of said photons radiated from said source means, and
    said first and second locations are further located in such close proximity such that said detector provides a positive response to an increase in density in response to an increase in density of said formation in a vicinity of said source and said detector.

14. An apparatus according to claim 13, wherein:
    said source is a Cesium 137 source, and a location of an opening in said collimating means for substantially collimating said source and said second location are located within one inch of each other.

15. An apparatus according to claim 2, further comprising:
    (c) a second detector means for detecting photons Compton scattered by said formation, said second detector means positioned at a third location and arranged such that photons having Compton scattered enter said apparatus for detection by said second detector means, wherein said first and third locations are located and said source and second detector means are arranged such that said second detector means provides a negative integral response to an increase of density in said earth formation for said densities and Pe factors typical of earth formations.

16. An apparatus according to claim 15, wherein:

said detector means and said second detector means each detects at least the number of said scattered photons incident each respective said detector means.

17. An apparatus according to claim 16, wherein:
said detector means and said second detector means further detect the energies of said scattered photons incident said detector means, and
said detector energies are broken into a plurality of energy windows.

18. An apparatus according to claim 2, further comprising:
(c) at least one second detector means for detecting photons Compton scattered by said formation, said second detector means positioned on said apparatus at at least one third location circumferentially spaced around said apparatus from said second location, and arranged such that photons having Compton scattered enter said apparatus for detection by said at least one second detector means, wherein each said at least one third location is located, and said source means and said at least one second detector means are arranged such that a particular said second detector means detecting photons entering said apparatus at a particular said third location provides a non-negative integral response to an increase of density in said earth formation for said densities and Pe factors typical of earth formations.

19. An apparatus according to claim 18, wherein:
each respective said detector means detects at least the number of scattered photons incident said respective detector means.

20. An apparatus according to claim 19, wherein:
said respective detector means each further detect the energy of scattered photons incident said respective detector means.

21. An apparatus for obtaining fine spatial resolution indications of at least one characteristic of an earth formation traversed by a borehole, comprising:
(a) a chemical source means for irradiating said formation with photons of a known energy which are capable of Compton scatterning in said formation; and
(b) a detector means for detecting photons Compton scattered by said formation,
said chemical source means positioned according to a first location defined by a statistical average of where photons from said source means which will be detected by said detector means enter said formation, and said detector means positioned according to a second location defined by a statistical average of where said photons from said source means which were Compton scattered in said formation enter said apparatus for detection by said detector means, wherein a distance between said first and second locations is less than one mean free path for said known energy photons in a formation having a density and Pe factor typical of earth formations.

22. An apparatus according to claim 21, wherein:
at lest one of said source and detector means is uncollimated relative to said formation so as to permit a substantial number of multiply scattered photons to be detected by said detector means.

23. An apparatus according to claim 22, further comprising:

(c) shielding means disposed between said source and detector means for substantially reducing amounts of photons reaching said detector means directly from said source means without Compton scattering in said formation.

24. An apparatus according to claim 23, wherein:
said detector means is substantially coaxial with said source means relative to a perpendicular to a long axis of said borehole, with said source means located relatively close to a wall of said borehole, said shielding means located behind said source means, and said detector means located behind said shielding means, wherein said detector means is substantially shielded from photons emanating from said source means directly towards said detector means, but said detector means is substantially uncollimated relative to a volume of said formation in a vicinity of said source means.

25. An apparatus according to claim 23, wherein:
said shielding means substantially collimates said detector relative to said formation, and said source means is uncollimated relative to said formation; and
said source and detector means are relatively displaced along a long axis of said borehole, and said source means is in relative close proximity to a wall of said borehole and said detector means is relatively distant from said borehole wall.

26. An apparatus according to claim 25, wherein:
said source is a Cesium 137 source positioned at said first location, and said first location and a location of an opening in said shielding means which substantially collimates said detector are located within one inch of each other.

27. An apparatus according to claim 23, wherein:
said shielding substantially collimates said source means relative to said formation, and said detector means is uncollimated relative to said formation; and
said source and detector means are relatively displaced along a long axis of said borehole, and said detector means is in relative close proximity to a wall of said borehole and said source means is relatively distant from said borehole wall.

28. An apparatus according to claim 27, wherein:
said source is a Cesium 137 source, and a location of an opening in said shielding means for substantially collimating said source and said second location are located within one inch of each other.

29. An apparatus according to claim 22, further comprising:
(c) a second detector means for detecting photons Compton scattered by said formation, said second detector means positioned according to a third location defined by a statistical average of where photons from said source means which will be detected by said second detector means enter said apparatus after having been Compton scattered, wherein said first and third locations are located at more than one mean free paths apart.

30. An apparatus according to claim 29, wherein:
said detector means and said second detector means each detects at least the number of said scattered photons incident each respective said detector means.

31. An apparatus according to claim 30, wherein:

said detector means and second detector means further detect the energies of said scattered photons incident said detector means, and said detected energies are broken into a plurality of energy windows.

32. An apparatus according to claim 29, further comprising:

(d) shielding means disposed between said source and detector means for substantially reducing amounts of photons reaching said detector means directly from said source means without Compton scattering in said formation.

33. An apparatus according to claim 22, further comprising:

(c) at least one second detector means for detecting photons Compton scattered by said formation, said at least one second detector means positioned on said apparatus according to at least one third location circumferentially spaced around said apparatus from said second location and defined by a statistical average of where photons from said source means which will be detected by said second detector means enter said apparatus after having been Compton scattered, wherein a distance between said first and each third location is less than one mean free path for said known energy photons in a formation having a density and Pe factor typical of earth formations.

34. An apparatus according to claim 33, wherein:

each respective said detector means detects at least the number of scattered photons incident said respective detector means.

35. An apparatus according to claim 34, wherein:

said respective detector means each further detect the energy of scattered photons incident said respective detector means.

36. An apparatus according to claim 33, further comprising:

(d) shielding means disposed between said source and detector means for substantially reducing amounts of photons reaching said detector means directly from said source means without Compton scattering in said formation.

* * * * *